(12) United States Patent
Marlatt et al.

(10) Patent No.: US 9,489,387 B2
(45) Date of Patent: Nov. 8, 2016

(54) STORAGE MANAGEMENT OF DATA STREAMED FROM A VIDEO SOURCE DEVICE

(71) Applicant: Avigilon Corporation, Vancouver (CA)

(72) Inventors: Shaun P. Marlatt, Vancouver (CA); Oren Shir, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 14/568,077

(22) Filed: Dec. 11, 2014

(65) Prior Publication Data

US 2015/0199366 A1 Jul. 16, 2015

Related U.S. Application Data

(60) Provisional application No. 61/927,923, filed on Jan. 15, 2014.

(51) Int. Cl.
*G06F 17/30* (2006.01)

(52) U.S. Cl.
CPC ... *G06F 17/30085* (2013.01); *G06F 17/30088* (2013.01); *G06F 17/30203* (2013.01); *G06F 17/30858* (2013.01)

(58) Field of Classification Search
CPC .................. G06F 17/30067; G06F 17/30085; G06F 17/30088; G06F 17/30203; G06F 17/30858
USPC ...................................................... 707/823
See application file for complete search history.

(56) References Cited

U.S. PATENT DOCUMENTS

| | | | |
|---|---|---|---|
| 5,732,240 A | | 3/1998 | Caccavale |
| 5,828,788 A | * | 10/1998 | Chiang .............. H04N 19/37 375/240.12 |
| 6,885,395 B1 | * | 4/2005 | Rabbani .............. H04N 1/2112 348/231.1 |
| 7,869,700 B2 | | 1/2011 | MacLean et al. |
| 2003/0023742 A1 | | 1/2003 | Allen et al. |
| 2004/0240859 A1 | | 12/2004 | Karimoto et al. |
| 2005/0210527 A1 | | 9/2005 | Hisamatsu et al. |
| 2006/0109915 A1 | | 5/2006 | Unger |
| 2006/0146934 A1 | | 7/2006 | Caglar et al. |
| 2008/0063359 A1 | | 3/2008 | Grigorian |

(Continued)

FOREIGN PATENT DOCUMENTS

WO WO 2014/007762 A1 1/2014

OTHER PUBLICATIONS

International Patent Application No. PCT/US2014/71734; Int'l Preliminary Report on Patentability; dated Dec. 18, 2015; 27 pages.

*Primary Examiner* — Shahid Alam
(74) *Attorney, Agent, or Firm* — Baker & Hostetler LLP

(57) ABSTRACT

A computer implemented method for managing data received from a video source device is disclosed. At least a first storage tier and a second storage tier on a storage medium are identified for respectively storing different categories of data. As data streams are received from the video source, the data streams are associated with at least the first storage tier or the second storage tier and data from the received streams are stored in the associated storage tier. When the storage medium is full or meets some other specified maximum capacity threshold, data is deleted beginning with data that has an age that exceeds one or more specified maximum retention times, followed by data with the oldest age from one or both of the first and second storage tiers.

33 Claims, 12 Drawing Sheets

(56) References Cited

U.S. PATENT DOCUMENTS

| | | |
|---|---|---|
| 2008/0212946 A1 | 9/2008 | Boston et al. |
| 2010/0030578 A1* | 2/2010 | Siddique ............ G06Q 10/0637 705/3 |
| 2010/0153574 A1* | 6/2010 | Lee .................... H04L 12/1827 709/231 |
| 2010/0202519 A1 | 8/2010 | Koo et al. |
| 2011/0016469 A1 | 1/2011 | Klein |
| 2012/0301108 A1 | 11/2012 | Zetterower et al. |

* cited by examiner

STORAGE MANAGEMENT OF DATA STREAMED FROM A VIDEO SOURCE DEVICE

CROSS REFERENCE TO RELATED APPLICATIONS

The present application claims priority to U.S. Provisional Patent Application No. 61/927,923 filed on Jan. 15, 2014, the contents of which are hereby incorporated herein by reference in its entirety.

TECHNICAL FIELD

The current disclosure relates generally to managing the storage of data streamed from a video source device.

BACKGROUND

In a typical video surveillance system, one or more cameras may be communicatively coupled to a server system. As video data is recorded by the cameras, it is forwarded to the server system where it is stored for subsequent retrieval. Client systems are communicatively coupled to the server system and may be used to request and receive streams of recorded video data.

Video surveillance systems are frequently required to be in operation twenty-four hours a day and seven days a week. As a result, large amounts of data may be recorded and stored by such systems. There are often physical limits to the amount of computing memory available for storing recorded data. The large amount of data that may be recorded in surveillance systems raises the practical issue of how to manage the data so that the desired data may be quickly accessed, while also operating within the storage capacity limits of the system.

SUMMARY

Applicants disclose herein systems and computer implemented methods for managing data received from a video source device. In an example embodiment, a storage management system identifies at least a first storage area, which may be referred to as a storage tier, for storing a first category of data and a second storage area or tier for storing a second category of data. As encoded data streams are received at the storage management system, the system associates one or more data streams with the first storage area and associates one or more data streams with the second storage area. The data streams are stored in the associated storage areas. The storage management system monitors the stored data to determine whether a storage area and/or the storage medium is full or meets some other specified maximum capacity threshold. If so, the storage management system deletes data in excess of the threshold. In an example embodiment, the storage management system deletes data having an age that exceeds one or more specified maximum retention times. If the stored data still exceeds a threshold, data with the oldest age from one or both of the first and second storage tiers may be deleted.

According to another aspect of the disclosed embodiments, the storage management system may identify a storage ratio specifying the relative amount of data to be stored in the first and second storage tiers. When necessary to maintain the ratio, the data with the oldest age may be deleted from one or both of the first and second storage tiers such that the specified storage ratio is maintained. In an example embodiment, the first storage tier may be a long term storage tier having a long term maximum retention time, and the second storage tier may be a short term storage tier having a short term maximum retention time that is shorter than the long term maximum retention time.

According to another aspect of the disclosed embodiments, the data streams may comprise at least two virtual streams of different resolutions. The storage management system associates the lower resolution virtual stream with the short term storage tier, and the higher resolution virtual stream with the long term storage tier. In an example scenario, the virtual streams may comprise multiple virtual streams with each capturing a different region of interest in a field of view. In such a scenario, the storage management system may associate a first region of interest with the short term storage area, and a second region of interest with a long term storage area. The different regions of interest may comprise different portions of a field of view, in which case, a virtual stream of a central portion of the field of view is associated with the long term storage tier, and a virtual stream of a non-central portion of the field of view is associated with the short term storage tier.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

Figure 1:
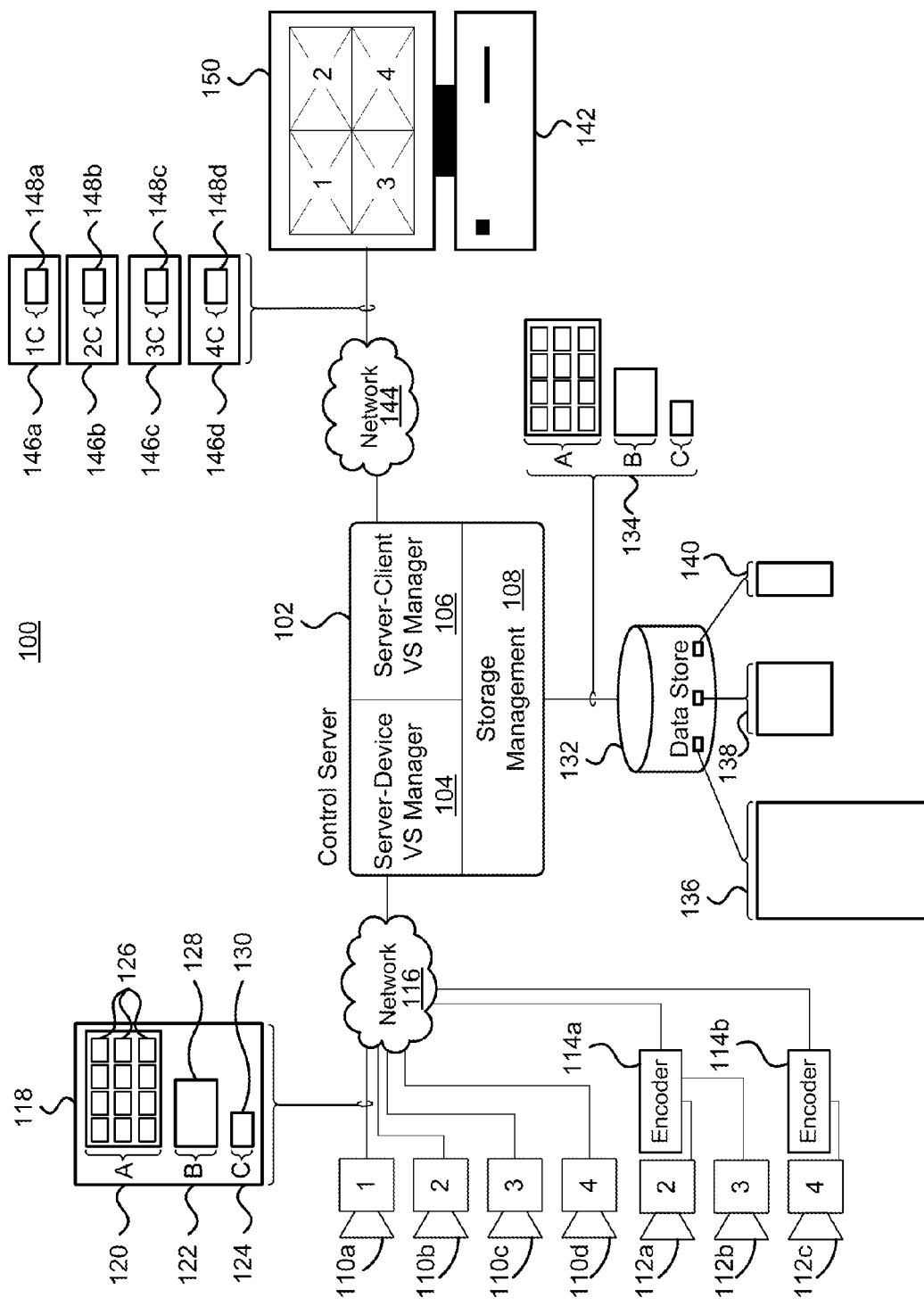
FIG. 1 depicts an example surveillance system adapted to generate and store multiple resolution encodings.

Generally, digital surveillance systems comprise a number of cameras connected to a monitoring station. The monitoring station stores video that is received from the numerous cameras. The monitoring station allows the received video to be streamed to one or more connected clients for monitoring. The cameras may be analog or digital cameras connected to an encoder that streams an encoding of the video at a particular resolution to the monitoring station. The cameras may further comprise IP cameras that include an encoder for streaming an encoding of the video at a particular resolution over an IP network to the monitoring station.

The encoders, whether incorporated into a camera or separate from the camera, may use various possible encoding/compression formats when encoding the video in order to reduce the required storage size and network bandwidth for streaming the encoded video. Commonly used formats in the surveillance industry include JPEG, MPEG-2, MPEG-4 and H.264. A monitoring client will, in some circumstances, display video from multiple cameras at once. Accordingly, the monitoring client must receive and decode multiple video encodings. Even if the video is encoded to reduce the file size, it may be difficult to stream multiple full resolution streams to a monitoring station over a wide area network (WAN). Compression techniques may further reduce the file size of an encoding without greatly reducing the quality of the encoding for a particular resolution. However, decoding of such compression techniques is more computationally complex. Accordingly, a monitoring client may not be able to decode in a timely manner multiple encodings for display.

In order to provide a plurality of encodings that can be decoded and displayed at a monitoring client, it is possible to use heavy compression on the videos to reduce the bandwidth. However, compression techniques that allow the multiple video encodings to be decoded and displayed in a timely manner at the monitoring client may significantly reduce the video quality. While the video quality may be sufficient for viewing at the display resolution, it may not provide sufficient quality to allow detailed viewing of a portion of the encoded video.

In order to provide video that can be streamed in real-time to a monitoring location, as well as video that retains a substantial portion of the video details, the video may be encoded according to various encoding parameters including, for example, resolution, frame rate, and various other quality settings. In an example scenario, a low resolution encoding may be used to stream the video to monitoring clients, while a high resolution encoding may be stored at a central monitoring station and provided to monitoring locations when a more detailed examination of a portion of the video is required. However, when viewing the full resolution encoding it must still be transmitted to the monitoring client, which may be slow given the large size of the full resolution encoding.

While some encoding techniques, such as JPEG 2000, can encode multiple resolutions in a single image, it may be desirable to stream multiple independent encodings from a video source device to a monitoring station. The multiple independent encodings may be stored for subsequent retrieval. Further, when the encodings are independent, as opposed to a single encoding as is the case for JPEG 2000, a high resolution encoding can be deleted from storage when no longer relevant in order to provide additional storage. The low resolution encoding may be retained for longer periods of time.

The embodiments described herein relate generally to systems and methods for managing the storage of data streams from a video source device on a data storage medium having finite storage capacities. The disclosed storage management system comprises program code, executable by a processor, which determines when a data stream recorded by the cameras should be stored, and where the data streams should be stored on the data storage medium. The disclosed system further determines which previously stored data should be deleted when the storage medium is full, or when other criteria such as, for example, a storage threshold, has been satisfied.

In one particular series of embodiments described herein, a video source device provides data streams comprising multiple independent resolution encodings, which may be thought of as collectively forming a "mosaic stream," to a control server. One of more of the encodings may be a virtual stream recorded at a specified resolution of the entire field of view of a camera. One or more of the other encodings may comprise a mosaic of individually encoded virtual streams of different regions of interest. Each different region of interest may be a virtual stream of a particular area, which may be referred to as a "tile," in a camera's field of view such that a mosaic of tiles can be assembled to represent the entire field of view. For example, a full resolution encoding may be provided by a 2×2 mosaic of tiles of encoded video. Accordingly, when a video client wishes to view a detailed view of a portion of the full frame, only a subset of the mosaic tiles needs to be provided, which reduces the required bandwidth and processing.

Since each of the different data streams are independently encoded, and can be independently decoded, the data storage management program may be executed to direct different data streams to be stored in different storage areas/locations or "tiers" of the storage medium. In some embodiments, the data storage management system may store different tiles of one of the resolution encodings in different storage tiers. For example, the system may identify a storage area or tier as a long term storage tier and store in that long term storage tier virtual streams of lower resolution encodings of a full frame. The system may designate another tier as being devoted to short term storage tier and store in that short term storage tier some or all of the tiles of the full resolution encoding. In an example embodiment, particularly relevant tiles of the full resolution encoding, such as regions in the frame with movement, or which capture a door, may be stored in the long term storage tier, and less relevant tiles may be stored in the short term storage tier.

The data storage management program may selectively remove certain video data from the storage medium pursuant to defined criteria. For example, higher resolution encodings may be removed from the short term storage tier before encodings stored on the long term storage tier are removed. The defined criteria for removing or deleting data may comprise any suitable parameters including, for example, storage capacity limits and a length of time data has been stored.

The systems and methods disclosed herein may be employed for storage management of a mosaic stream comprising multiple independently decodable virtual streams wherein a full resolution stream is composed of multiple virtual streams of a region of interest, with each region of interest represented by a tile that covers a separate area of the field of view of the camera. In such an embodiment, all of the regions of interest may be assembled into a grid to represent the entire field of view.

While some aspects of the disclosed data storage management systems and methods are described in the context of a mosaic stream, it will be appreciated that the disclosed systems and methods may be used to manage other types of data streams. For example, two cameras (or another type of video source device) may each send a coordinated H.264 Real-Time Transport Protocol (RTP) stream, wherein one data stream is a high resolution stream and the other data stream is a low resolution stream. In such an embodiment, the high resolution stream may be stored in the short term storage tier, and the low resolution stream may be stored in the long term storage tier. According to another example, a camera may transmit one JPEG stream serving as a primary video stream. In such an embodiment, one storage medium tier may store even frames of the stream and another storage medium tier may store odd frames of the stream. In yet another example where one camera sends one H.264 RTP stream, one storage medium tier is employed to store key frames of the stream and another storage medium tier is used to store P frames, or predicted picture frames, of the stream.

Example Encoding and Storage Management System

FIG. 1 depicts an example system for encoding video and storing encoded data streams. In an example embodiment, the system may be a surveillance system capable of providing multiple resolution encodings of video. The system 100 comprises a control server 102 that provides various functionality including receiving video from a plurality of video source devices, managing the storage of the received videos, and streaming videos to one or more clients. The control server 102 may be provided by one or more physical computers and/or by one or more virtual computers. In one alternative embodiment (not depicted), the control server 102 functionality may be implemented by one or more of the video source devices 110, 114 themselves, which can then directly send the multiple encodings to clients. The control server may be connected to a plurality of digital IP cameras 110a, 110b, 110c, 110d (referred to collectively as IP cameras 110) as well as a plurality of streaming encoders 114a, 114b (referred to collectively as encoders 114), which may be coupled to one or more digital or analog cameras 112a, 112b, 112c (referred to collectively as cameras 112). The IP cameras 110 and the encoders 114 may be referred to collectively as video source devices. The video source devices may stream video to the control server over a network 116. The network 116 may comprise any suitable technology and may be provided by one or more individual networks, including wired local area networks (LANs), wireless local area networks (WLAN), as well as wide area networks (WAN).

The control server 102 provides virtual stream manager functionality. In an example embodiment, a virtual stream manager resident, which may be referred to as the "server-device virtual stream manager" or "server-device VS manager," manages the virtual streams that the control server 102 receives from the recording devices. The server-device VS manager 104 provides functionality for configuring the video source devices 110, 114 in order to stream independent multiple resolution encodings. The server-device VS manager 104 may also comprise functionality to receive streams from video source devices 110, 114 and demultiplex the received streams into the individual virtual streams. The demultiplexed virtual streams may be combined and re-multiplexed in different ways, including, for example, by removing one or more of the virtual streams. The individual virtual streams of a stream from the video source devices 110, 114 may be provided to the storage management functionality 108 for storage.

One or more of the individual virtual streams may be provided to additional virtual stream manager functionality. For example, the virtual stream manager, which may be referred to herein as the "server-client virtual stream manager" or "server-client VS manager" 106, manages the virtual streams that the control server 102 sends to the client 142. The individual virtual streams may be provided to the server-client VS manager 106 either from the storage management functionality 108 or from the server-device VS manager 104. The server-client VS manager 106 streams one or more virtual streams to a monitoring client over a network 144.

Each of the video source devices 110, 114 may be configured to provide various virtual stream encodings depending upon the capabilities of the respective video source devices 110, 114, the capabilities of other components, such as the bandwidth of network 116, the bandwidth of network 144, the available storage space, and the requirements of the surveillance system. The video source devices 110, 114 may provide a single resolution encoding, or a plurality of individual resolution encodings. Further, each resolution encoding may be provided by a number of virtual streams. Stream 118 is depicted in FIG. 1 as being streamed from IP camera 110 to the control server 102 over network 116.

As depicted, the stream 118 comprises a number of individual resolution encodings 120, 122, 124. The individual resolution encodings 120, 122, 124 are depicted as encoding the same portion of the source video, which is contemplated as being substantially all of the region of interest of a sensor of the camera 110a. Each of the individual resolution encodings 120, 122, 124 encodes the source video using a respective compression algorithm and may reduce the resolution, frame rate and/or video quality. For example, the resolution encoding 120 may be encoded to the full resolution of the source, the resolution encoding 122 may be encoded to a half of the source resolution, and the resolution encoding 124 may be encoded to a quarter of the source resolution.

Each of the individual resolution encodings 120, 122, 124 may be provided by one or more virtual streams 126, 128, 130 within the stream 118. Each virtual stream 126, 128, 130 comprises at least a portion of the video source encoded at the compression level of the respective resolution encodings 120, 122, 124. As depicted, the full resolution encoding 120 is provided by a 3×4 tiling of virtual streams. Each of the 12 virtual streams 126 is encoded with the same compression technique, and when the twelve virtual streams are combined they provide the full resolution of the source video. The resolution encoding 122 is depicted as being provided by a single virtual stream. Accordingly, the virtual stream 128 may have a resolution of ½ of the video source. Similarly, the virtual stream 130 may have a resolution of ¼ of the video source. Although described as providing a tiling of a larger area, the virtual streams do not need to form tiles; rather, each virtual stream may encode a particular region of interest, which may comprise the full source video, or a portion thereof. The various virtual streams may overlap the same region of interest, or encode non-overlapping portions of the source video.

The server-device VS manager 104 may receive streams such as stream 118 from the video source devices 110, 114. The server-device VS manager 104 may demultiplex the virtual streams of individual resolution encodings 120, 122, 124 from the received stream 118, and the demultiplexed virtual streams may be passed to the storage management functionality 108 for storage and storage management. Additionally, one or more of the virtual streams may be passed to the server-client VS manager 106 for streaming to the client.

Figure 10:
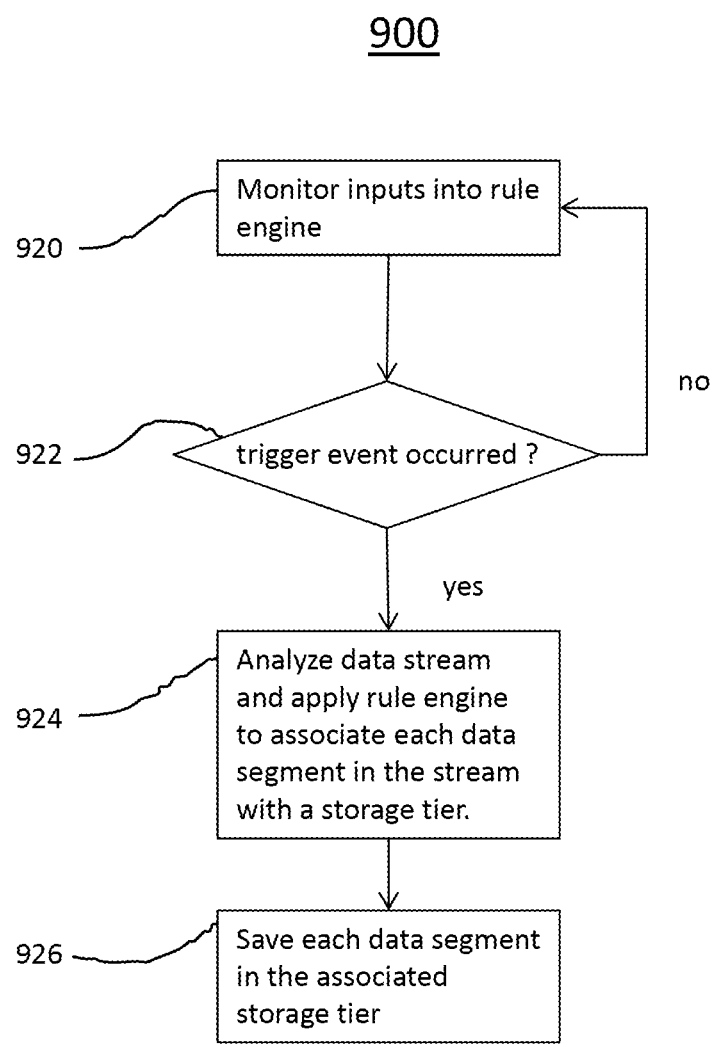
FIG. 10 depicts a flow diagram of an example method for storing data streams.
Figure 11:
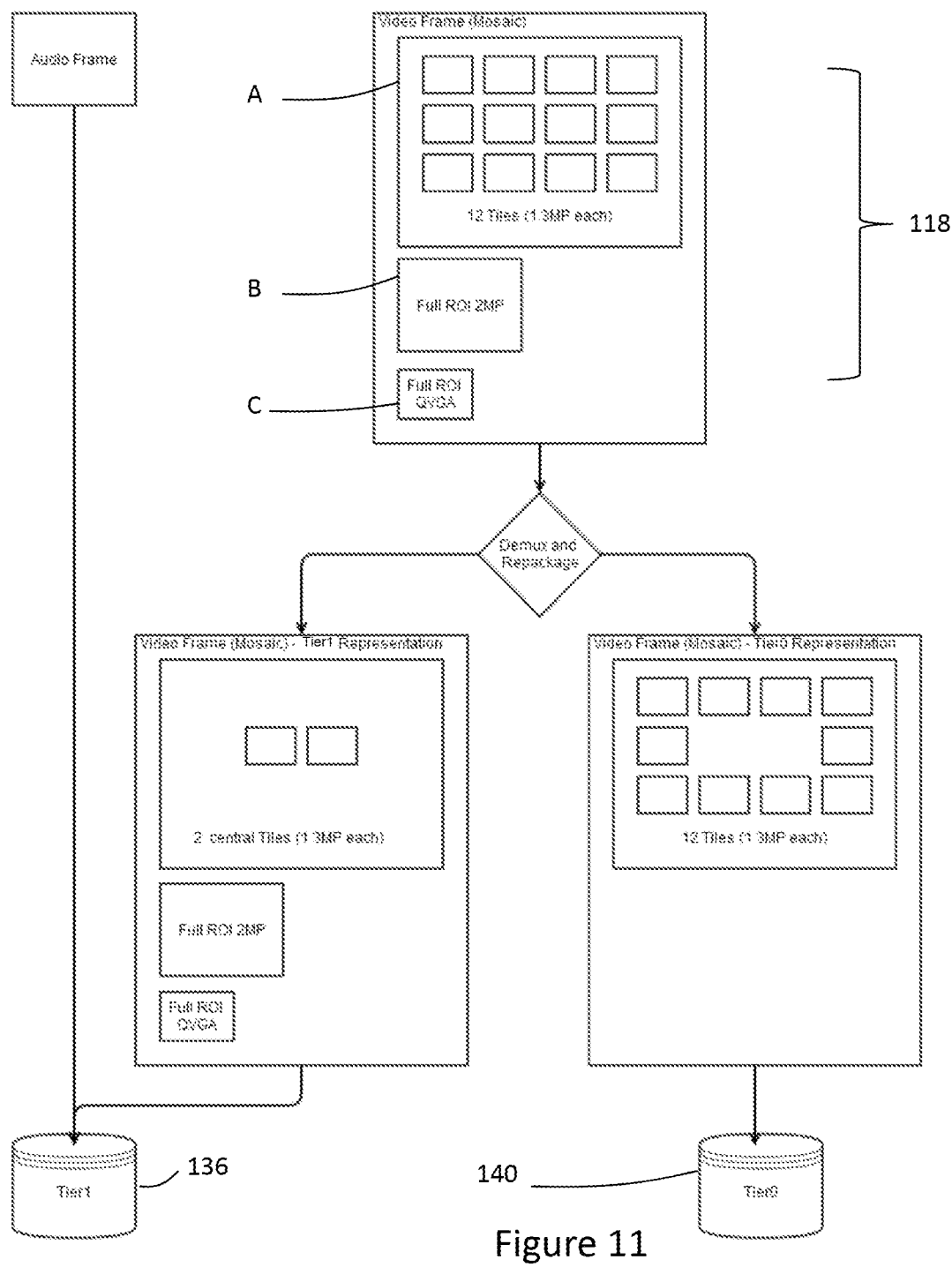
FIG. 11 depicts a diagram of an example process for storing data streams on a data storage medium.
Figure 12:
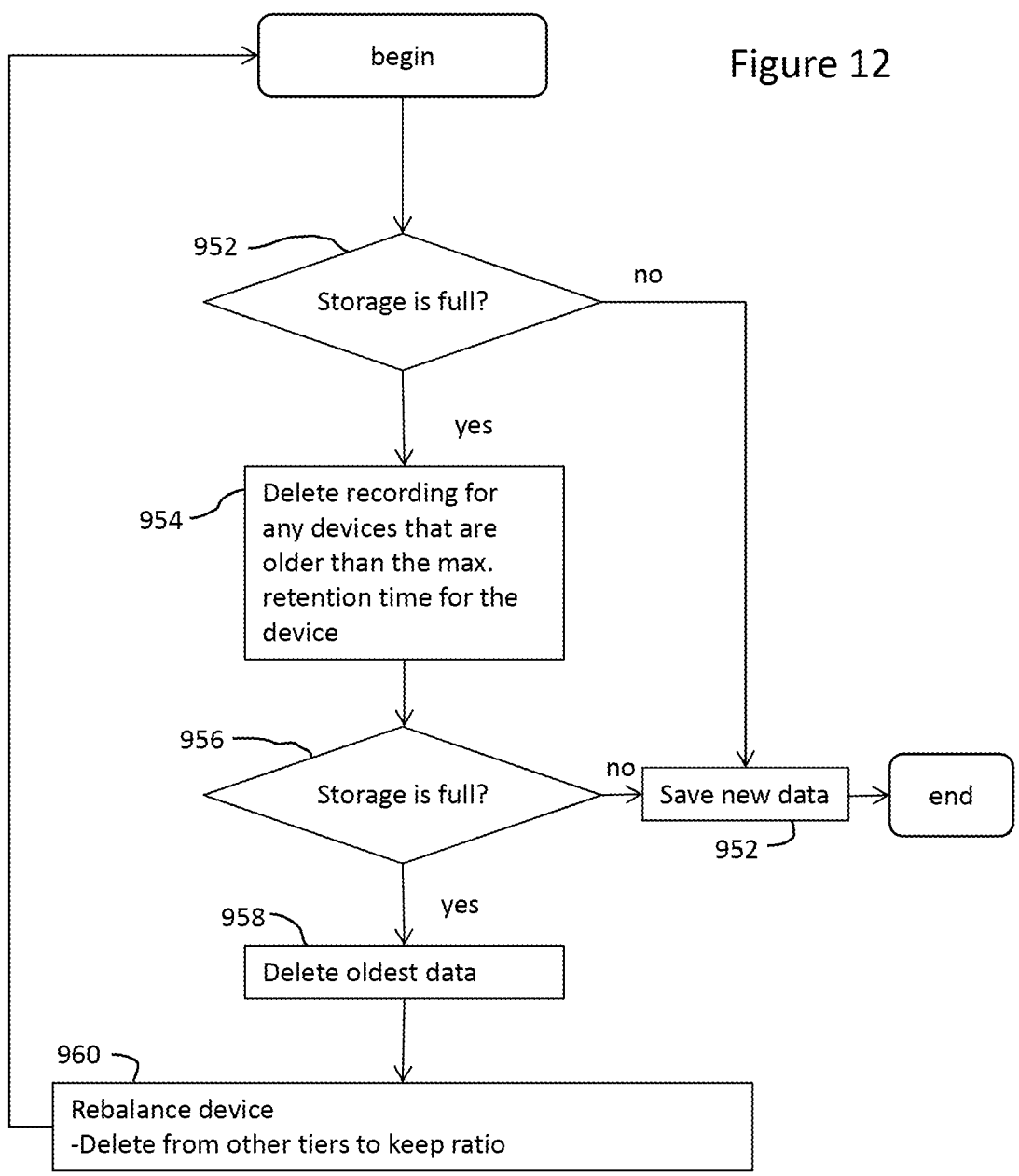
FIG. 12 depicts a flow diagram of an example method for deleting data from a data storage medium.

The storage management functionality 108 comprises a data management program that is executable by a processor in the control server 102 and adapted to manage the storage of the resolution encodings in a data storage medium 132 as described herein including in connection with FIGS. 10-12. The data management program may pass each or a selected number of the resolution encodings 134 to the data storage medium 132. The data management program organizes the stored data by storing different video data in different storage areas which may be referred to, for example, as storage sections or tiers in the data storage medium 132. In an example embodiment, the storage tiers may comprise a short term storage tier 136, a medium term storage tier 138, and a long term storage tier 140. A short term storage tier 136 may be used to store each of the resolution encodings. The data management program is adapted to delete video data from each storage tier based on a set of criteria. The data storage medium 132 may be comprised in the same computing system as the control server 102. Additionally or alternatively, the data store 132 may be provided by separate computing devices (not shown). Further still, although depicted as being directly connected to the control server 102, it is contemplated that the data store 132 may be coupled to the control server 102 by a network. The data storage medium 132 may comprise one or more non-volatile computer-readable mediums for persistent data storage such as one or more local hard drives. Alternatively, the persistent storage may be remote hard drives in cloud storage or in network storage.

As described above, the server-client VS manager 106 may receive resolution encodings from either the server-device VS manager 104 or the storage management functionality 108 for streaming to a monitoring client 142 over network 144. The resolution encodings may be from different video source devices. As depicted, each resolution encoding 146a, 146b, 146c, and 146d may be streamed individually, or one or more of resolution encodings may be combined together into a single stream. In the example scenario depicted in FIG. 1, a number of virtual streams 148a, 148b, 148c, and 148d corresponding to the low resolution encodings from different video source devices are streamed to the monitoring device 142. The monitoring device 142 may receive and decode the virtual streams 148a, 148b, 148c, and 148d and display the decoded video 150.

Streaming Multiple Resolution Encodings

Figure 2:
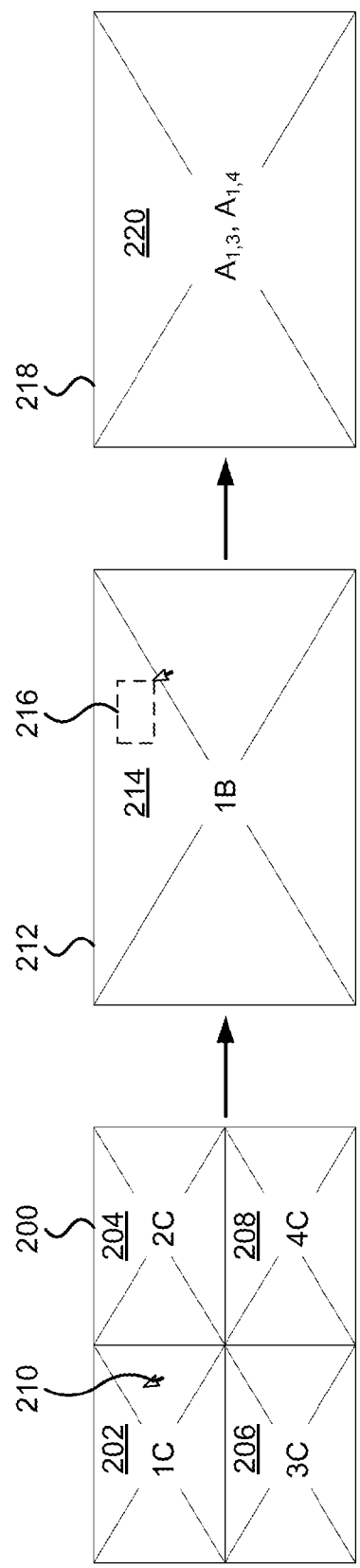
FIG. 2 depicts an example display monitor adapted to display multiple resolution encodings.

FIG. 2 depicts a monitor displaying different resolution encodings of video. FIG. 2 depicts three different views 200, 212, and 218. In an example embodiment, the monitoring client may initially display view 200, which comprises the lowest resolution encodings 202, 204, 206, 208 of four virtual streams. For example, the virtual streams from four different cameras may be displayed simultaneously. One of the low resolution encodings 202 may be selected for zooming in on, for example, by clicking on it with a mouse or other pointer 210. When the resolution encoding 202 is displayed full screen, the quality of the encoding may be lower than desired. Accordingly, the medium resolution encoding 214 from the selected camera view can be streamed and displayed as depicted in view 212. A user may wish to zoom in further in order to view a portion 216 of the displayed resolution encoding 214. Again, the quality of the resolution encoding 214 may not be sufficient when zoomed-in to provide the desired image quality. Accordingly, the full resolution encoding may be used in displaying the zoomed in portion 220 as depicted in view 218. As described above, the full resolution encoding may comprise a number of virtual streams. Accordingly, only the virtual streams of the full resolution encoding that cover the selected zoomed in region need to be streamed to the monitoring client. For example, if the full resolution is provided as a 4×3 grid of virtual streams, the virtual streams in the top row and the third and fourth columns may cover the desired region.

Figure 3:
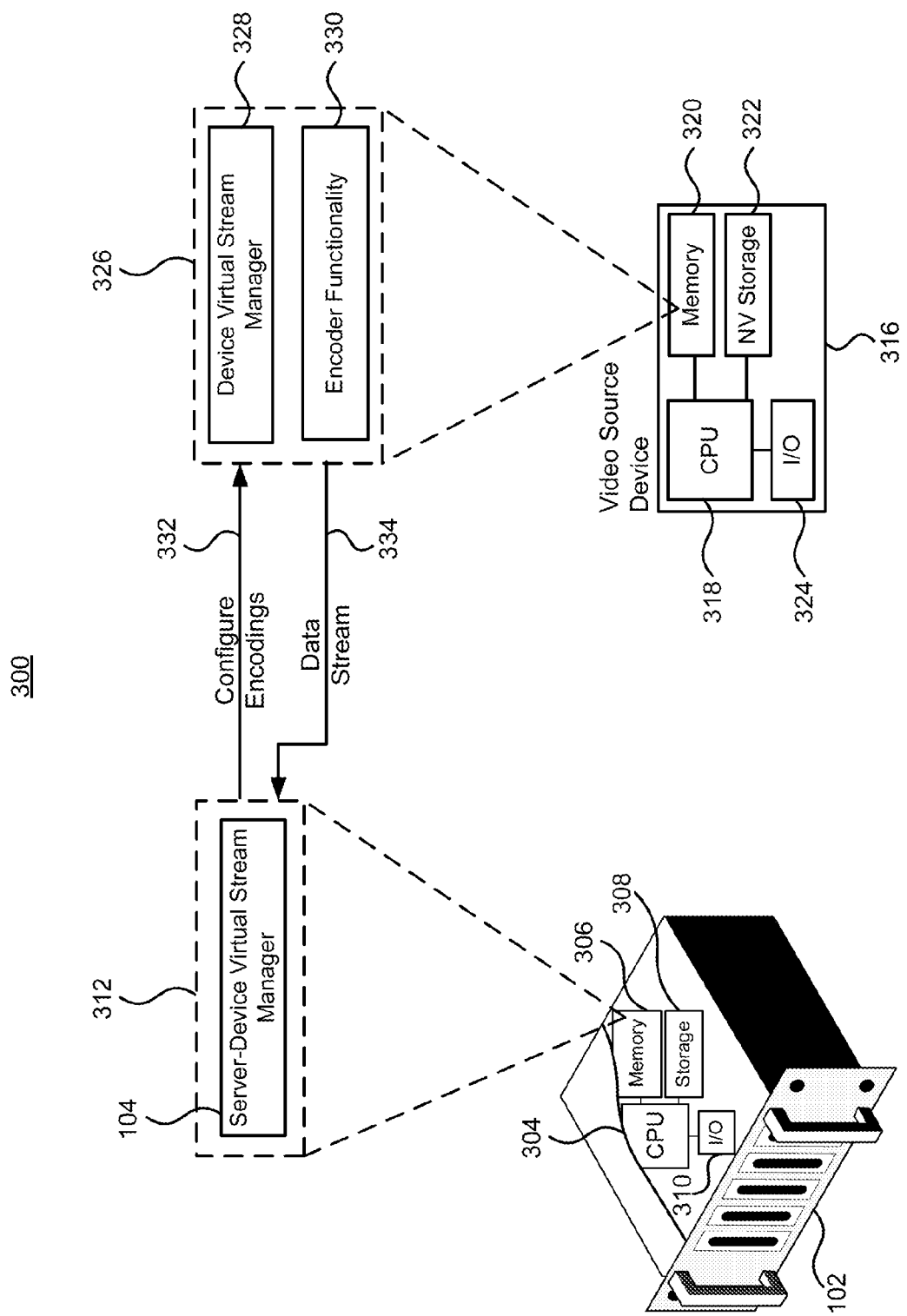
FIG. 3 depicts an example video source device and control server adapted to generate and receive multiple resolution encodings.

Providing multiple virtual streams allows efficient bandwidth usage when streaming video to a monitoring location regardless of whether video from multiple cameras is being displayed, or if only a small portion of a single camera is zoomed in for display. FIG. 3 depicts a video source device 316 and functionality as well as a control server 102 and functionality capable of streaming multiple resolution encodings. As shown, the control server 302 comprises a central processing unit 304 for processing instructions. Corresponding instructions may be stored in memory 306. The control server 302 may further comprise non-volatile storage 308 for persistent storage of data and instructions. The control server 302 may still further comprise one or more input/output (I/O) interfaces 310. The I/O interfaces allow input and/or output components to be connected to the control server. For example, a network interface card (NIC) may be connected to the control server 302 in order to connect the control server 302 to a communication network. The CPU 304 may execute instructions stored in memory. The instructions, depicted as 312, when executed may configure the control server 302 to provide the server-device VS manager 314, along with other functionality described herein.

The video source device 316, which may be, for example, a camera device or system, comprises a central processing unit 318 for processing instructions. The instructions may be stored in memory 320. The video source device 316 may further comprise non-volatile storage 322 for persistent storage of data and instructions. The video source device 316 may further comprise one or more input/output (I/O) interfaces 324. The I/O interfaces allow input and/or output components to be connected to the video capture. For example, a network interface card (NIC) may be connected to the input/output interface 324 in order to connect the video source device 316 to a communication network. Further, if the video source device 316 is a camera, whether IP or analog, the I/O interface may further connect a sensor to the CPU for capturing image data. The CPU 318 may execute instructions stored in memory. The instructions, depicted as 326, when executed may configure the video source device 316 to provide the device virtual stream (VS) manager 328 as well as encoder functionality 330.

The server-device virtual stream (VS) manager 314 of the control server 302 and the device VS manager 328 of the video source device 316 cooperate in order to configure 332 video source device 316, which may include, for example, a camera, as desired or required. The encoder functionality 330 may be configured in order to provide multiple encoding components that can each encode video and specified settings, which may include a number of rows and columns of individually encoded tiles. The encodings provided by the encoding components can be streamed to the control server 302 as depicted by data stream 334.

It will be appreciated that while the Figures and description herein refer to video source device 316 and server 102 separately, in some embodiments the functionality from both described systems may exist in a single system. For example, the video source device 316 may be a camera system that provides all of the functionality described herein relating to cameras and image collection, as well as the functionality described herein relating to control server 102. In such an embodiment, a camera system may operate as a server with the ability to control and communicate with other camera systems.

Figure 4:
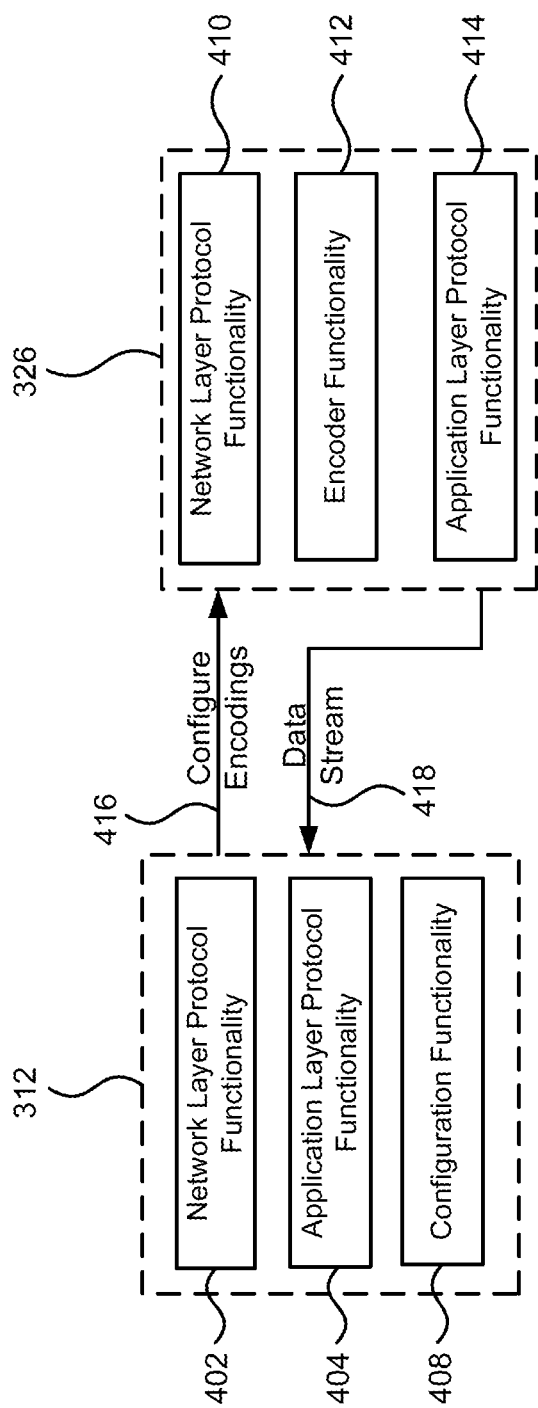
FIG. 4 depicts example functional features provided by a video source device and control server.

FIG. 4 depicts further video source device functionality and control server functionality capable of streaming multiple resolution encodings. The functionality may be provided in, for example, the control server 302 described above by instructions stored in the memory. When executed by the CPU of the control server, the instructions may provide network layer protocol functionality 402, application layer protocol functionality 404, and configuration functionality 408. It will be appreciated that other functionality may be provided in the control server.

Similarly, video source device functionality may be provided in a video source device such as the video source device 316 described above by executing instructions by a processor. The video source device functionality may include network layer protocol functionality 410, encoder functionality 412, and application layer protocol functionality 414. The video source device may provide additional functionality not depicted in FIG. 4.

The network layer protocol functionality 402, 410 of the control server 102 and the video source device 316 cooperate in order to configure the video source device in the desired manner. The network layer protocol functionality provides a standardized network interface for video devices and allows for the discovery, configuration, management and control of compliant devices. The network layer protocol functionality provides a common interface between the control server 102 and the video source device 316 that allows the discovery of the video source device 316 and its capabilities as well as the configuration of the device. As described further below, the network layer protocol functionality may be used to configure the encoder functionality 416 in order to set up the device to stream multiple independent resolution encodings, including tiled encodings, as described above. Once configured as desired, the video source device may encode source video using the configured encoder functionality in order to provide a data stream of the configured resolution encodings. The data stream from the encoder can be transmitted from the video source device to the control server using application layer protocol functionality 404/414 which provide for real time control and transport of the data stream 418.

Once the data stream is received at the control server 102, it may be processed in order to group virtual streams belonging to the same resolution encoding together. As described above, a single resolution encoding may be composed of one or more independently encoded tiles. The resolution encodings may then be further processed as desired, for example, for storage or streaming to a monitoring client.

The control server may also comprise configuration functionality 408. The configuration functionality 408 may allow a user to set, view and/or modify configuration parameters of components of the surveillance system. For example, the configuration functionality may allow a desired encoder configuration for video source devices.

Figure 5:
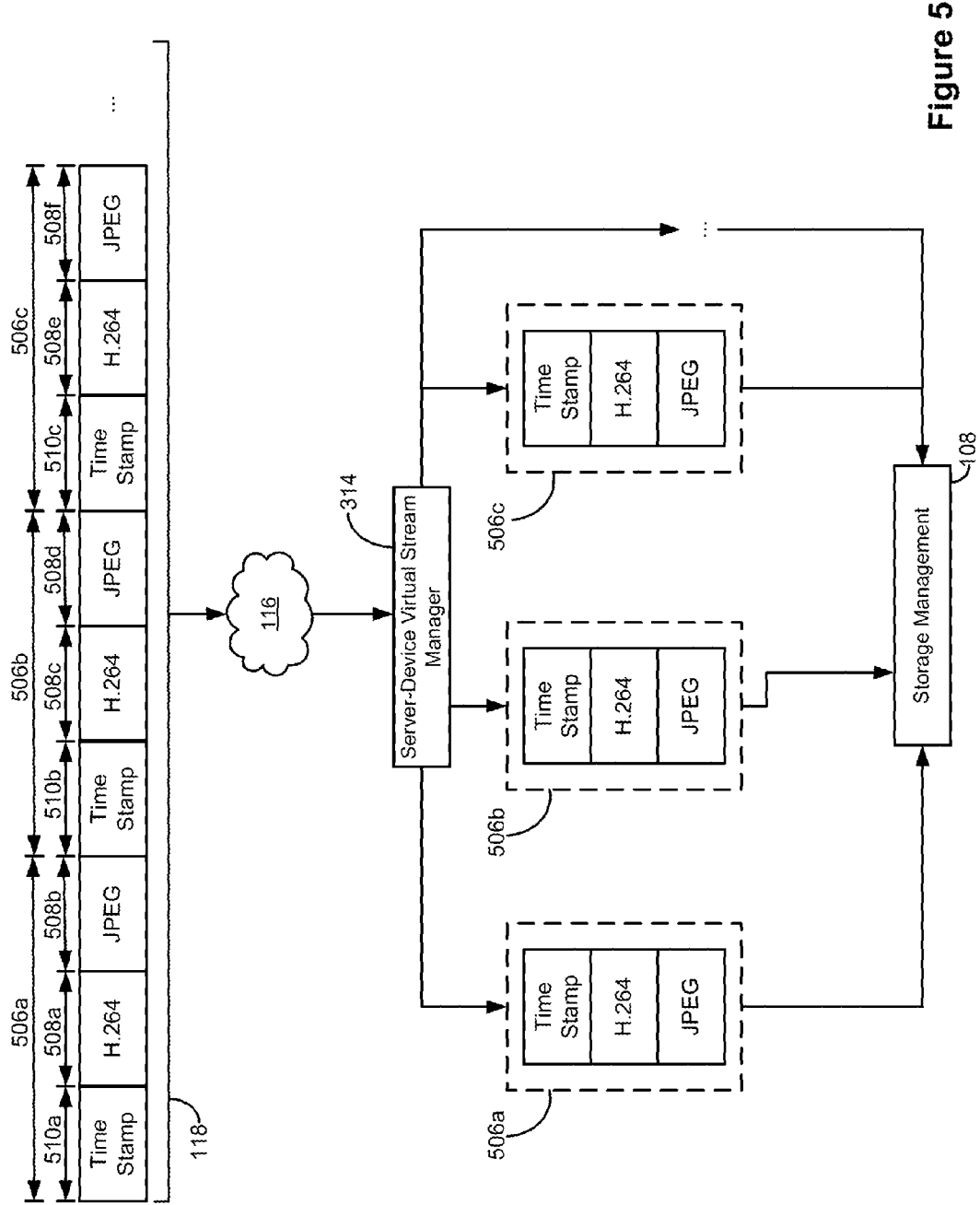
FIG. 5 depicts example processing of a video stream comprising multiplexed container frames.

The portion of the video stream 118 shown in FIG. 5 comprises first and second container frames 506a-c (collectively, "container frames 506") prepared by the video source devices prior to their transmission over the network 116 to the control server 102. Each of the container frames 506a-c respectively comprises a time stamp 510a-c common to all the virtual frames 508 of that container frame 506a-c. Each of the virtual frame headers comprises a frame delimiter delimiting each of the virtual frames 508 from one another. In the illustrated example embodiment, the frame delimiter comprises the vstream id. The container frames 506 in FIG. 5 each comprises one virtual frame 508a,c,e for H.264 encoded video, and another virtual frame 508b,d,f for JPEG encoded video. As opposed to sending the H.264 and JPEG video to the control server over separate streams each with its own timestamp, in the depicted embodiment, placing the H.264 and JPEG videos into the container frames 506 and then transmitting the container frames 506 essentially time division multiplexes the H.264 and JPEG videos to the control server 102.

Associating a group of virtual frames 508 with a single source frame time stamp facilitates synchronization between virtual frames 508 and, consequently, video from different virtual streams that is displayed on the client 142. The synchronized virtual streams also result in reduced in latency. When the server-device VS manager 314 receives the stream 118, it is able to demultiplex each of the container frames 506 based on the time stamp 510 of each frame 506, and is subsequently able to demultiplex the container frames 506 from each other and each of the virtual frames 504 from any other virtual frames 508 within the container frame 506. The control server 302 may subsequently process any one or more of the container frames 506 and virtual frames 504 as desired, such as by storing the container frames 506 in the data store 132.

Figure 6:
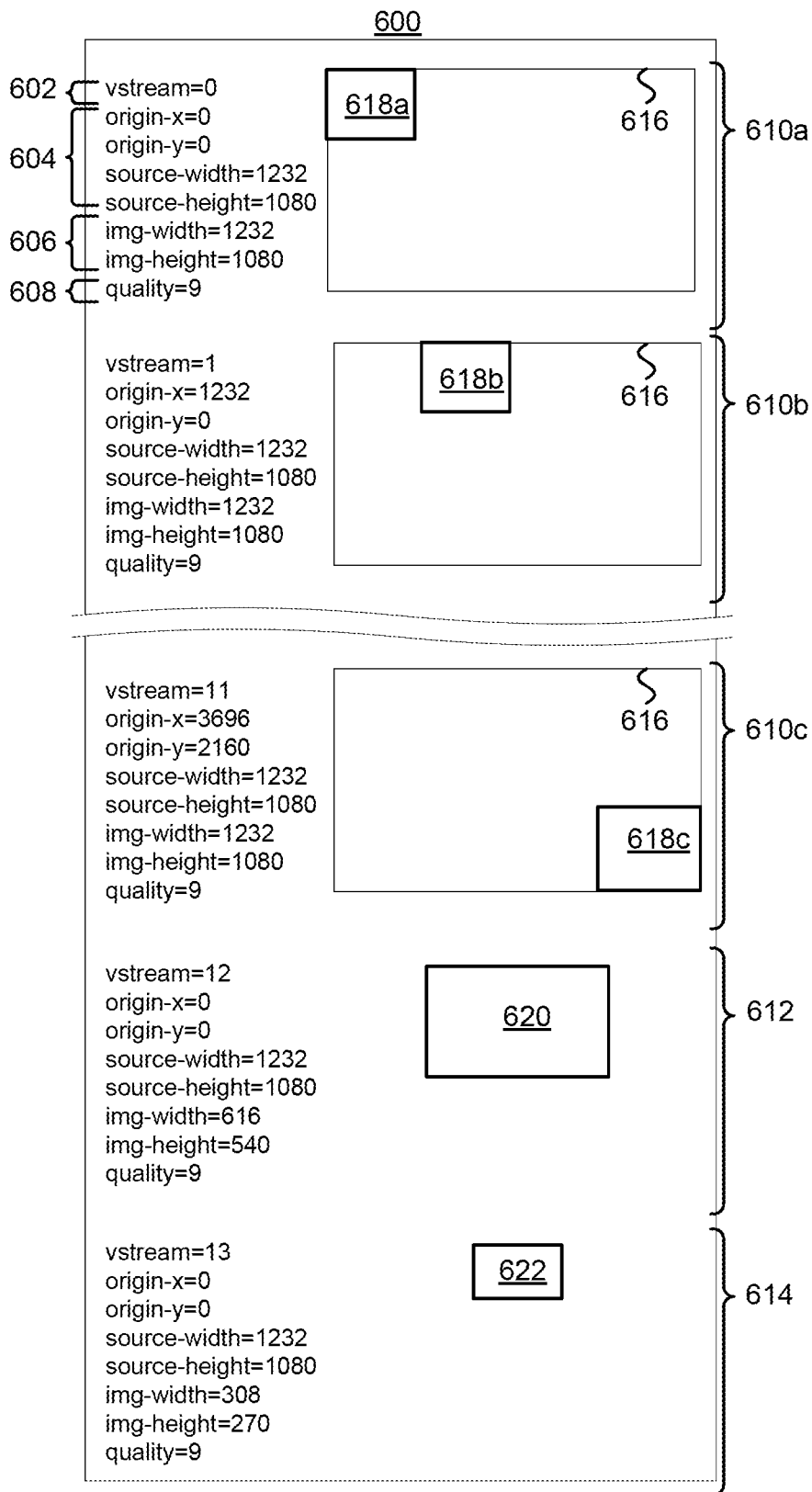
FIG. 6 depicts an example video source device response that describes individual virtual streams comprised in multiple resolution encodings.

FIG. 6 depicts a response from the video source device describing individual virtual streams that provide the multiple resolution encodings. The response 600, which may be referred to as description information or a description file, describes the stream that will be provided from the video source device. The response 600 describes each of the virtual streams in the video stream. The video stream may have a number of individual virtual streams 610a, 610b, 610c, 612, and 614. The encoding parameters of each virtual stream are provided in the response 600. For example, each virtual stream may include a unique identifier 602 of the virtual stream, the area or region of interest 604 of the video source encoded by the virtual stream, a resultant resolution 606 of the encoded virtual stream, and an indication of the quality of the encoded virtual stream 608. As depicted schematically, virtual streams may encode different regions of interest at the same encoder settings. For example, virtual streams 610a, 610b, 610c encode different regions of interest of the source video at the same encoder settings. Further, virtual streams may encode the same region of interest at different parameter settings. For example, virtual streams 612 and 614 encode the same region of interest but result in different resolutions. The description 600 of the stream may be provided in various formats and provides sufficient information in order to allow a component that receives the stream, such as control server, to properly demultiplex and identify the component virtual streams.

Figure 7:
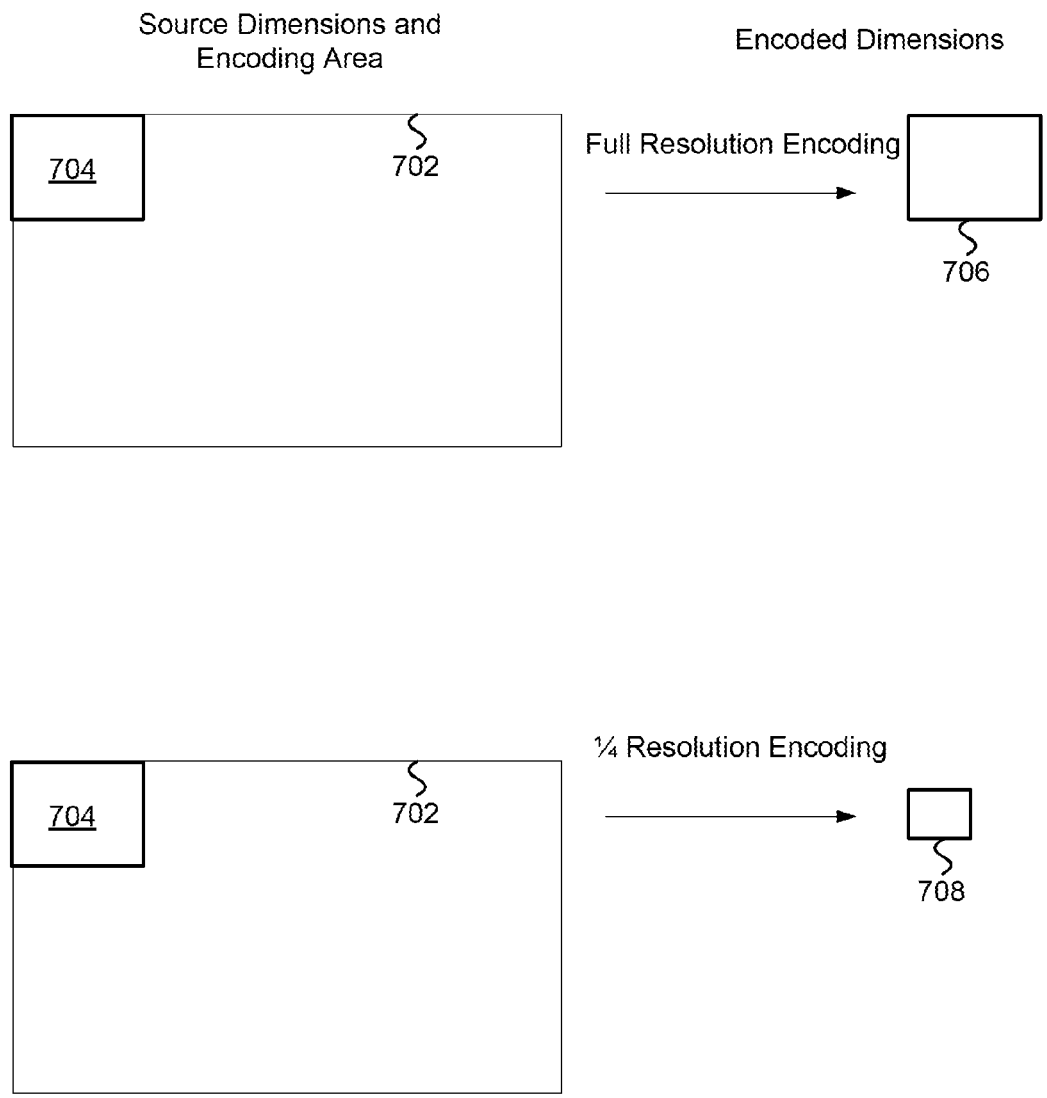
FIG. 7 depicts an illustration of an example encoding of a region of interest at different resolutions.

FIG. 7 depicts the encoding of a tile at different resolutions. A virtual stream may encode a particular area of the video source to a particular size. For example, the source video may have an area 702 of 4944×3280. A first virtual stream may encode a portion 704 of the total area located at x=0, y=0, that is the top left of the source video, and having dimensions 1232×1080. The first virtual stream may provide a full resolution encoding of the area 704, which will result in the first virtual stream encoding 706 having dimensions 1232×1080. A second virtual stream may encode the same area 704, but the encoding may down sample the resolution in order to provide ¼ of the source resolution. As such, the second virtual stream 708, which encodes the same source video area 704, will have dimensions of 308×270.

Figure 8:
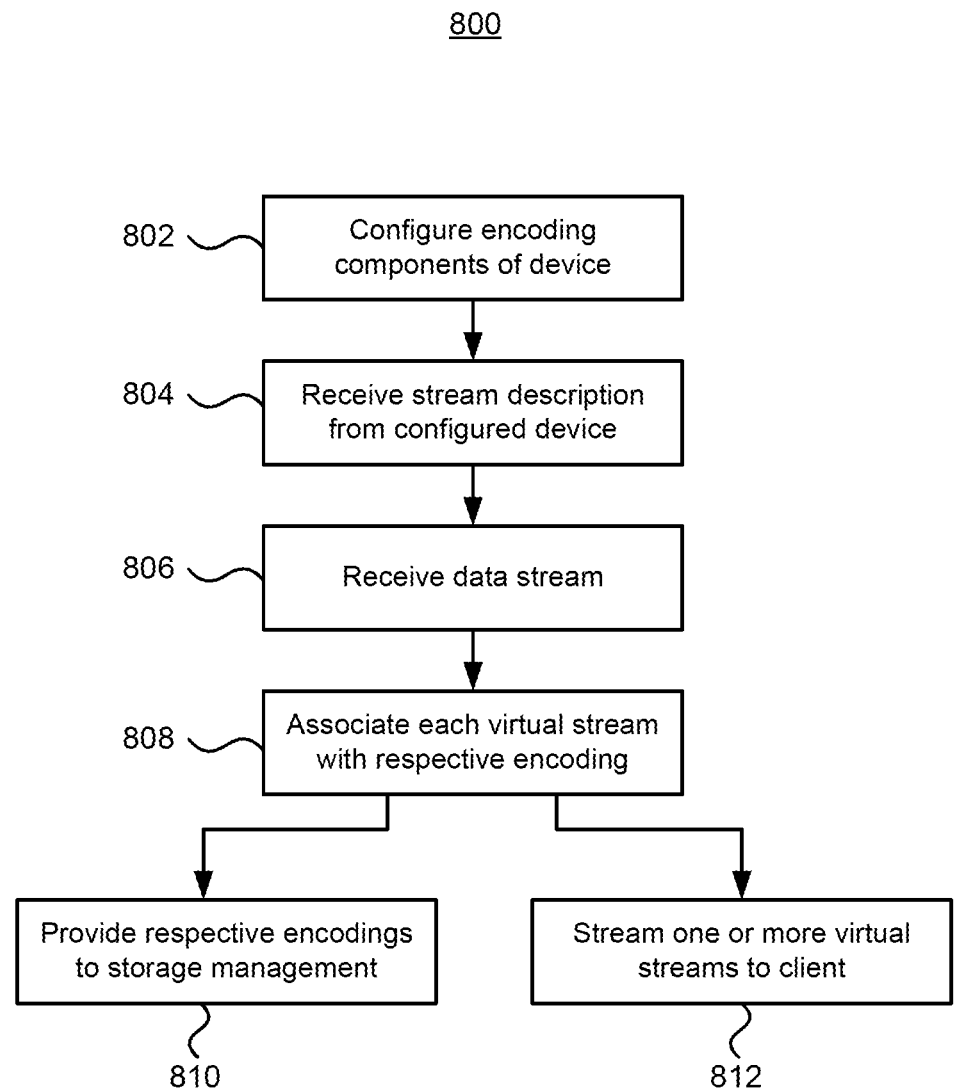
FIG. 8 depicts a flow diagram of an example method for streaming data from a video source device.

FIG. 8 depicts a method 800 of streaming data from a video source device 316 to a control sever 302. At block 802, encoding components of a video source device are configured. The configuring operation may comprise transmitting one or more configuration commands from, for example, control server 302 to one or more video source devices 316 which may comprise encoders 114. The encoding components of the video source device 316 are configured in order to provide a number of virtual streams within the stream sent from the video source device 316. The encoding components may be configured in order to provide independent resolution encodings of at least a portion of a source video. At least one of the independent resolution encodings is provided by a plurality of virtual streams each of which comprises a tile of a mosaic of the resolution encoding. An encoding component comprised in video source device 316 may be configured to provide each virtual stream.

Once the encoding components for a stream are configured, at block 804, a description of the stream such as is described above in connection with FIG. 6 is communicated from the video source device 316 to the control server 302. In an example embodiment, the stream description may be provided by the video source device 316 to the control server 302 in response to a description request sent by the control server 302. The received description describes the plurality of individual streams the video source device is configured to provide. Each of a desired resolution encoding may be provided by one or more virtual streams described in the description. The description of each virtual stream may include an identifier of the virtual stream as well as encoding information of the virtual stream and an indication of the area of the source video that is encoded by the virtual stream.

At block 806, the data stream itself is communicated from video source device 316 and received at control server 302. At block 808, the control server 302 associates each virtual stream with a respective resolution encoding. Identifying which of the virtual streams is associated with the respective resolution encodings may be done using the information in the stream description. Additionally, if multiple virtual streams encode the same area of the source video, it may be necessary to utilize additional information encoded in the virtual stream in order to determine which resolution encoding the virtual stream is associated with. Once the respective resolution encoding is associated with each virtual stream, the virtual streams of the same resolution encodings may be further processed. For example, at block 810, the virtual streams of each resolution encoding may be provided for storage. The virtual streams and the stream description 509 may be stored in relation to each other. Additionally or alternatively, at block 812, one or more of the virtual streams of a resolution encoding may be streamed to one or more monitoring clients. It will be appreciated that while in the above description it is implied that a number of virtual streams are processed before the individual virtual streams are stored and/or transmitted to a client, each of the virtual steams is independently decodable and may be immediately stored and/or sent to a client.

Data Storage Management of Streaming Data

Figure 9:
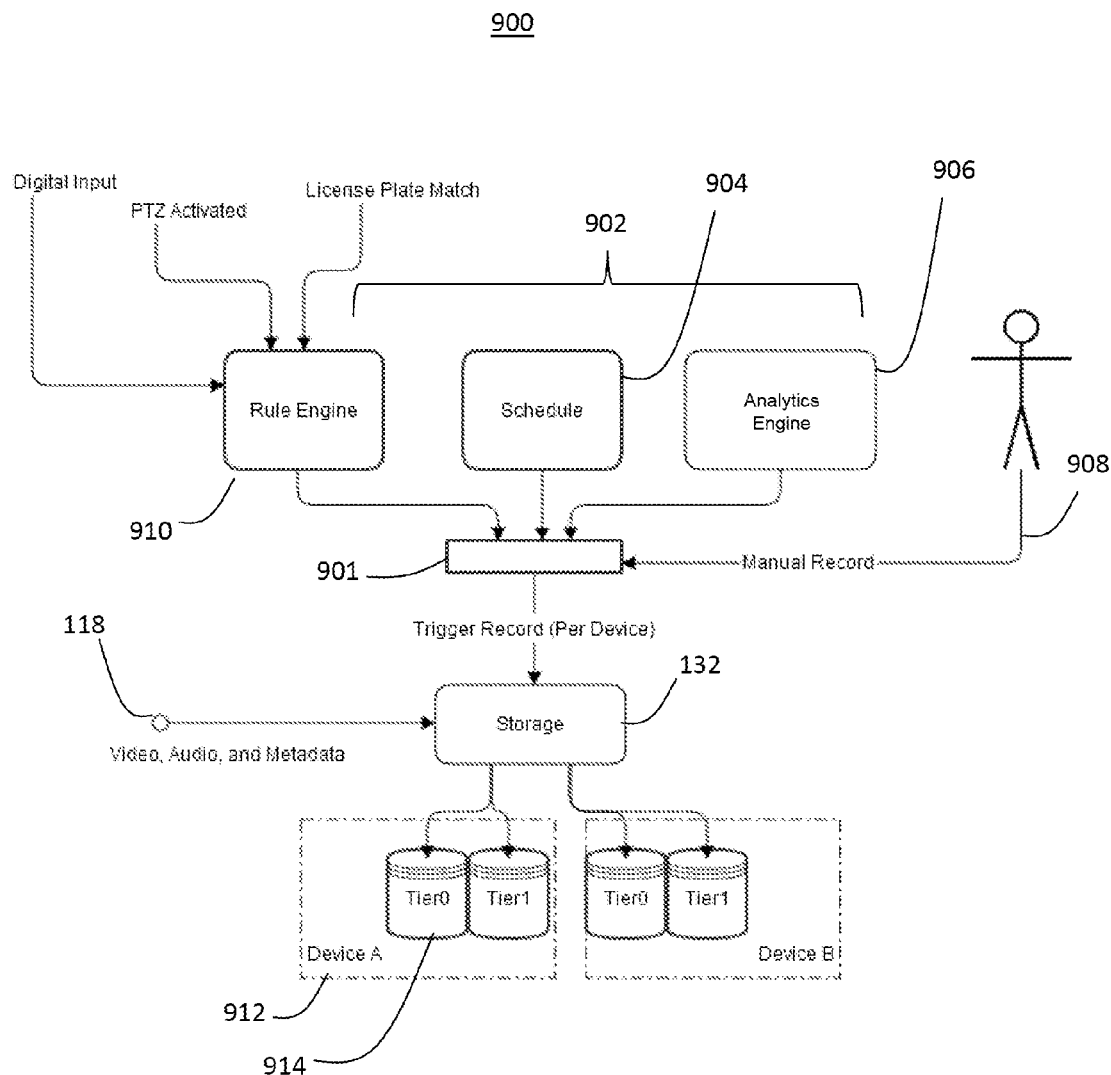
FIG. 9 depicts a flow diagram of an example method for storing data streams received from a video source device in different locations of a data storage medium.

As noted above in connection with FIG. 1, the storage management functionality 108 comprises a data storage management program that is executable by a processor in the control server 102. The data storage management program manages the storing of the data stream 118, which may comprise, for example, video, audio, and metadata, in different areas, sections, or tiers of the data storage medium 132. FIG. 9 depicts a method performed by the data management storage program to determine when a data stream 118 is to be stored, and where certain data in the data stream is to be stored on the data storage medium 132. Referring to FIG. 9, a processor 901 in the control server 102 executes the data storage management program to perform a method comprising detecting any of a series of trigger record events 902 that cause a data stream 118 from a device to be recorded whenever an occurrence of a trigger source event 902 is detected. Triggering events may be any information that is suitable for causing streamed data to be recorded. For example, trigger record events 902 may include:

1. Scheduled recording 904: Recording of a data stream 118 from a video source device is triggered based on a user-defined schedule. Schedules may be defined for each video source device.

2. Analytics Engine 906: Recording is triggered when a certain analytic criteria is detected in a field of view of the video source device. An example of detectable analytic criteria is motion in a field of view. In a further example, detecting that analytic criteria has been satisfied may comprise determining by analysis of meta data that is associated with a video stream whether an event has occurred. For example, the meta data associated with a video stream may indicate various events occurred at particular times during the course of a video stream. In an example scenario, the meta data may indicate that motion has occurred, or faces or objects have been recognized, at particular times during the video. In an example embodiment, the video stream may have been previously analyzed and the results of the analysis stored in the meta data associated with a video stream. In an example scenario, a video stream may have been analyzed at the recording device, e.g., camera, for various events such as for motion or the existence of people or objects and the results of that analysis stored in the meta data.

3. Manual recording 908: Recording is triggered manually by a user. For example, recording may be triggered by a human operator through a user interface device on the client while viewing a live video stream from a video source device.

4. Rule engine 910: Recording is triggered when one or more user-defined rules are met. Rule inputs may be any event source in the system, such as, for example, detection of a pan-tilt-zoom (PTZ) command, detection of an event in a recorded stream such as, for example, the presence of a particular license plate or human face, or detection of any other specified digital input received from another part of the digital surveillance system.

In an example embodiment, the data storage management program may employ a minimum record time per trigger that determines the pre- and post-recording buffer configuration. In other words, where the system employs automated triggering events, the system may store the relevant video stream for a prescribed period before the triggering event and for a prescribed period after the triggering event. For example, a default value of five (5) seconds may be used as a recording buffer. It will be appreciated that the buffer size may be any suitable length and may be customized by the user.

Separate storage spaces or areas 912 in the data storage media 132, which may be referred to as "bins," may be allocated to each video source device. In an example embodiment, each bin 912 may be subdivided into tiers 914, with each storage area or tier being associated with a different category of data. In the example embodiment of FIG. 9, the storage medium 132 is shown as divided into two bins 912 (Bin A and Bin B), one for each of two video storage devices A, B, wherein each bin 912 is subdivided into two tiers 914 (tier 0, tier 1). One tier 914 may be designated as a long term storage (e.g., Tier 1) and the other tier 914 may be designated as short term storage (e.g., Tier 0).

The data storage management program also includes a rules engine for determining where each segment of data in the data stream 118 should be stored in the storage medium 132. More particularly, the rules engine may determine in which of the several storage areas a particular video segment should be stored. In an example embodiment, the rules engine may use metadata that is part of the data stream 118 as input for the rules engine. In an example scenario, the metadata may include a resolution and time stamp for each frame of video in the data stream 118. In such a scenario, the rules engine may include a rule that associates a data segment comprising the virtual stream having the smallest resolution with the long term storage tier 914. Other metadata may include the position of a virtual stream tile in the full resolution frame. The rules engine may employ this metadata to associate virtual streams positioned in a particular part of the frame (e.g., center) with the long term storage tier 914. Other metadata may indicate whether a virtual stream has motion recorded therein. The rules engine may employ this metadata to associate virtual streams containing motion with the long term storage tier 914. In still another example scenario, the metadata may indicate whether a virtual stream is covered by a motion mask. The rules engine may employ this information to associate the corresponding virtual stream with the long term storage tier 914.

FIG. 10 depicts a method 900 performed by the data management program to determine whether a data stream 118 should be recorded and, if so, associate data segments in the data stream with a corresponding storage area or tiers 914 in the storage medium 132. Upon execution by a processor in the control server 302, the data management program, at block 920, monitors inputs for trigger events such as those described above. At block 922, when the data management program determines an input indicates a trigger event 902 has occurred, the program, at block 924, analyzes the data stream 118 and inputs metadata into the data stream in the rules engine to associate data segments in the data stream 118 with a particular storage area or tier 914. Once the data segment has been associated with a particular storage area, at block 926, the data segment is saved to the associated storage tier 914.

FIG. 11 illustrates processing associated with an example data stream. In the example scenario of FIG. 11, the data stream 118 comprises a mosaic stream comprising three independent resolution encodings. In particular, in the example illustrated in FIG. 11, the data stream comprises a full resolution encoding "A," a medium resolution encoding "B," and a low resolution encoding "C." The full resolution encoding A comprises twelve virtual streams (tile) in a 3×4 grid, wherein each tile represents a 1.3 megapixel (MP) portion of the full resolution frame. Each of streams B and C comprise a single virtual stream of a full region of interest (ROI) recorded at 2 MP and quarter video graphics array (QVGA) resolutions respectively. Once a trigger event 902 has been detected, the data storage management program uses the metadata in the mosaic stream 118 to identify the resolution of each virtual stream (and in the case of the full resolution virtual streams, the position of that virtual stream in the full resolution frame). In an example scenario, the program associates the low resolution virtual stream C and the two central tiles of the full resolution stream A with a long term storage area or tier 136. The program associates the medium resolution virtual stream B and each tile of the full resolution virtual stream A except for the two central tiles in the short term storage tier 140.

While FIG. 11 depicts a scenario wherein two tiers 136, 140 are associated with the virtual streams in the mosaic stream 118 of each video source device, any number of storage areas may be employed. For example, three storage tiers 136, 138, 140 may be designated such as shown in FIG. 1, wherein the medium resolution virtual stream B may be associated with the medium term storage tier 138 (not shown in FIG. 11) instead of with the short term storage tier 138 as described in the above example. Alternative embodiments may be provided where different virtual streams in the mosaic stream 118 may be stored in the short, medium, and long term storage tiers 136, 138, 140. For example, the full resolution virtual streams may be stored in the long term storage tier, and the lower resolution virtual streams may be stored in the short term storage tier.

FIG. 12 depicts a process 950 performed by the data storage management program to free up space in the data storage medium 132 when the storage medium 132 is full or meets some other specified maximum capacity threshold. Referring to FIG. 12, at block 952, the data storage management program determines whether the data storage medium 132 is full or has reached some other specified threshold. If not, processing continues at block 952 where the data stream is saved in the associated storage tier in the manner as discussed above. However, if at block 952 the data storage management program determines a threshold for data stored in a particular storage area or areas has been reached or exceeded, at block 954, the program deletes from the storage medium 132 any data from any of the video source devices that exceeds a specified maximum retention time. At block 956, the program determines again whether the storage medium 132 is full or meets some other specified maximum capacity threshold. If not, processing continues at block 952 where the data stream is saved in the associated storage tier on the storage medium 132. If at block 956 the data in the storage area exceeds a threshold, processing continues at block 958 where data is deleted. The data that is deleted may be, for example, the next oldest data in one of the tiers 136, 140 on the storage medium 132.

In an example embodiment, the storage management program may be provided with a specified storage ratio ("tier ratio") between the two tiers (or between three or more tiers if more than two tiers are specified). The ratio defines the relative amount of data to be stored in each of the two or more storage areas. In an embodiment that employs a ratio, at block 960 of FIG. 12, the data storage management program deletes data from the other storage tier 136, 140 in a manner that maintains the specified ratio. For example, if after deleting all of the data that exceeds the maximum retention time, the storage threshold continues to be exceeded, the program may delete the next oldest data which, in an example scenario, happens to be stored in tier 1. In a scenario where deleting data results in the tier ratio becoming unbalanced, the program deletes some of the oldest data stored in tier 2 until the specified tier ratio is re-established.

According to another aspect of the disclosed embodiments, a maximum retention time may be specified for each of the long and short term storage tiers 136, 140. In an example scenario, the maximum retention time of the long term storage tier may be higher than that of the short term storage tier. The data storage management program may be configured to delete any data that is older than the respective maximum retention times of each tier. If all remaining data is younger than the maximum retention times and the storage medium 132 becomes full (or exceeds some other maximum capacity threshold), the data storage management program is configured to delete the oldest content from one of the short and long term tier storage tiers 136, 140, and to delete the oldest data from the other of the short and long term storage tiers 136, 140 until the tier ratio is rebalanced.

Accordingly, applicant has disclosed systems and methods for managing the storage of data streamed from a video source. In a disclosed embodiment, a data stream comprising multiple encoded video streams is received. The disclosed system, in response to a triggering event, analyzes the data to determine which of several storage areas or tiers each of the separate encoded video streams should be stored. Each of the storage areas is designated to store data having particular characteristics. The system selects a particular storage area for each of the encoded video streams based upon the characteristics of the video streams. The system is adapted to delete data from the storage areas or tiers when predefined thresholds are reached. When a threshold has been reached, data is selected for deletion using any suitable metric including, for example, data that has been stored for the longest length of time.

Although the above discloses example methods and system including, among other components, software executed on hardware, it should be noted that such methods and systems are merely illustrative and should not be considered as limiting. For example, it is contemplated that any or all of these hardware and software components could be embodied exclusively in hardware, exclusively in software, exclusively in firmware, or in any combination of hardware, software, and/or firmware. For example, network server components could be provided exclusively in the video source device. In such case, the client would interact directly with the device, and the video source device would manage its onboard storage in this manner. Accordingly, while the following describes example methods and apparatus, persons having ordinary skills in the art will readily appreciate that the examples provided are not the only way to implement such method and apparatus. For example, the methods may be implemented in one or more pieces of computer hardware, including processors and microprocessors, Application Specific Integrated Circuits (ASICs) or other hardware components.

The present disclosure has described various systems and methods with regard to one or more embodiments. However, it will be apparent to persons skilled in the art that a number of variations and modifications can be made without departing from the teachings of the present disclosure. For example, while the Figures and description herein refer to camera 118/video source device 316 and control server 102 separately, in some embodiments the functionality from both described systems may exist in a single system. For example, the video source device 316 may be a camera system that provides all of the functionality described herein relating to cameras and image collection, as well as the functionality described herein relating to control server 102. In such an embodiment, a camera system may operate as a server with the ability to control and communicate with other camera systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A computer implemented method for managing data, comprising:
    a computing system identifying at least a first storage area for storing a first category of data and a second storage area for storing a second category of data;
    the computing system receiving a plurality of data streams data stream composed of a plurality of resolution encodings that encode at least a portion of a source stream using at least one different video encoding parameter;
    the computing system associating one or more of the plurality of resolution encodings data streams from the received plurality of data streams with the first storage area and associating one or more of the plurality of resolution encodings data streams from the received plurality of streams with the second storage area;
    the computing system storing, in the first storage area, data for the one or more of the plurality of resolution encodings more data streams associated with the first storage area and storing, in the second storage area, data for the one or more of the plurality of resolution encodings data streams associated with the second storage area;
    the computing system determining data stored in at least one of the first storage area and the second storage exceeds a threshold; and
    deleting data in excess of the threshold, wherein the threshold is based on either a specified maximum retention time or a specified amount of data to be stored in the first storage area and in the second storage area.
2. The computer implemented method of claim 1, wherein deleting data in excess of the threshold comprises deleting data having an age that exceeds a threshold of one or more specified maximum retention times.
3. The computer implemented method of claim 1, further comprising:
    identifying a ratio specifying a relative amount of data to be stored in the first storage area and in the second storage area,
    wherein deleting data in excess of the threshold comprises deleting data from one or both of the first storage area and second storage area such that the ratio is maintained.
4. The computer implemented method of claim 3,
    wherein the first storage area is a long term storage area having a long term maximum retention time, and the second storage area is a short term storage area having a short term maximum retention time that is shorter than the long term maximum retention time.
5. The computer implemented method of claim 4,
    wherein receiving the data stream composed of a plurality of resolution encodings comprises receiving a first virtual stream capturing a first region of interest and receiving a second virtual stream capturing a second region of interest,
    wherein associating one or more of the plurality of resolution encodings with the first storage area and associating one or more of the plurality of resolution encodings with the second storage area comprises associating the first virtual stream with the first storage area and associating the second virtual stream with the second storage area.

6. The computer implemented method of claim 5,
wherein receiving the first virtual stream capturing the first region of interest comprises receiving the first virtual stream capturing a first field of view, and
wherein receiving the second virtual stream capturing the second region of interest comprises receiving the second virtual stream capturing a second field of view, the second field of view being different than the first field of view.

7. The computer implemented method of claim 6,
wherein the first field of view comprises a central portion of a larger field of view, and
wherein the second field of view comprises a non-central portion of the larger field of view.

8. A system for managing data, comprising:
a computing processor;
computing memory communicatively coupled with the computing processor, the computing memory having stored therein computer executable instructions that when executed cause the system to perform operations comprising:
   receiving a plurality of data streams, each composed of a plurality of resolution encodings that encode at least a portion of a source stream using at least one different video encoding parameter;
   identifying a first data stream and a second data stream in the plurality of data streams for recording;
   associating the first data stream with a first storage and the second data stream with a second storage, the first storage and the second storage allocated for storing different categories of data;
   storing data from the first data stream in the first storage; and
   storing data from the second data stream in the second storage.

9. The system of claim 8, wherein identifying the first data stream and the second data stream in the plurality of data streams for recording comprises detecting a trigger event.

10. The system of claim 9, wherein detecting the trigger event comprises detecting a user defined schedule indicating a data stream is to be recorded.

11. The system of claim 9, wherein detecting the trigger event comprises detecting an analytic criteria has been satisfied.

12. The system of claim 11, wherein detecting the analytic criteria has been satisfied comprises determining by analysis of a video stream that an event has occurred.

13. The system of claim 12, wherein determining by analysis of the video stream that the event has occurred comprises determining by analysis of the video stream that a motion has taken place in a field of view.

14. The system of claim 12, wherein detecting the analytic criteria has been satisfied comprises determining by analysis of meta data associated with the video stream that the event has occurred.

15. The system of claim 14, wherein determining by analysis of meta data associated with the video stream that the event has occurred comprises reviewing meta data recording results from previous analysis of the video stream.

16. The system of claim 9, wherein detecting the trigger event comprises detecting a user defined rule has been satisfied.

17. The system of claim 8, wherein associating the first data stream with the first storage and the second data stream with the second storage, the first storage and the second storage allocated for storing different categories of data, comprises allocating the first data stream to the first storage designated for short term storage and allocating the second data stream to the second storage designated for long term storage.

18. The system of claim 8, wherein the computing memory has stored therein computer executable instructions that when executed cause the system to perform further operations comprising:
   determining a threshold associated with at least one of the first storage and the second storage has been met;
   deleting data from at least one of the first storage and the second storage.

19. A computer implemented method for managing data, comprising:
   a computing system receiving a data stream, the data stream comprising a first encoding of a source stream, a second encoding of the source stream, and a third encoding of the source stream, each of the first encoding, the second encoding, and the third encoding encode at least a portion of the source stream using at least one different video encoding parameter;
   the computing system detecting a trigger event indicating to record the data stream;
   the computing system identifying from the data stream the first encoding, the second encoding, and the third encoding;
   the computing system associating each of the first encoding, the second encoding, and the third encoding with at least one of at least a first storage and a second storage, the first storage and the second storage designated for receiving different categories of data;
   the computing system detecting data in either the first storage or the second storage exceeds a threshold; and
   the computing system identifying data in the first storage or the second storage for deletion, the identified data being data that has been stored in the first storage or the second storage for longer than a defined retention period.

20. The computer implemented method of claim 19,
wherein the first encoding comprises a plurality of virtual streams, the second encoding comprises a single virtual stream, and the third encoding comprises a second single virtual stream; and
wherein associating each of the first encoding, the second encoding, and the third encoding with at least one of at least the first storage and the second storage comprises:
   associating a subset of the plurality of virtual streams comprised in the first encoding with the first storage, and associating the plurality of virtual streams except the subset with the second storage,
   associating the virtual stream comprised in the second encoding with the second storage, and
   associating the second virtual stream comprised in the third encoding with the third storage.

21. The computer implemented method of claim 20,
wherein the plurality of virtual streams comprised in the first encoding comprises a plurality of virtual streams forming a grid,
wherein associating the subset of the plurality of virtual streams with the first storage comprises associating with the first storage one or more of the plurality of virtual streams that are located centrally in the grid.

22. The computer implemented method of claim 21,
wherein the first encoding is a high resolution encoding as compared to a resolution of the second encoding and the third encoding, and
wherein the second encoding is a low resolution encoding as compared to the resolution of the first encoding and the third encoding.

23. The computer implemented method of claim 19, wherein associating each of the first encoding, the second encoding, and the third encoding with at least one of at least the first storage and the second storage comprises associating the first encoding with the first storage, the second encoding with the second storage, and the third encoding with the third storage.

24. The computer implemented method of claim 23,
wherein associating the first encoding with the first storage comprises associating the first encoding with a long term storage,
wherein associating the second encoding in the second storage comprises associating the second encoding with a medium term storage, and
wherein associating the third encoding in the third storage comprises associating the third encoding with a short term storage.

25. A computer implemented method of managing data, comprising:
a computing system receiving a data stream, the data stream composed of a plurality of resolution encodings that encode at least a portion of a source video stream using at least one different video encoding parameter;
the computing system identifying a first storage for storing the data stream;
the computing system determining whether a threshold has been exceeded in the identified first storage;
the computing system, upon determining the threshold has not been exceeded, storing data associated with the received data stream in the first storage;
the computing system, upon determining the threshold has been exceeded in the identified first storage, identifying first data for deletion from the first storage, deleting the identified first data for deletion, identifying whether the threshold is exceeded after deleting the identified first data,
upon determining the threshold has not been exceeded after deleting the identified first data, storing data associated with the received data stream in the first storage; and
upon determining the threshold is exceeded after deleting the identified first data, identifying second data for deletion from the first storage.

26. The computer implemented method of claim 25, further comprising:
the computing system determining whether a target ratio of data stored in the first storage and a second storage is satisfied;
the computing system, upon determining the target ratio is not satisfied, deleting data from the second storage sufficient to satisfy the target ratio.

27. The computer implemented method of claim 26, wherein deleting data from the second storage sufficient to satisfy the target ratio comprises deleting data from the second storage that has been stored in the second storage for a longest period of time.

28. The computer implemented method of claim 27, wherein deleting data from the second storage that has been stored for the longest period of time comprises continuing to delete data that has stored for the longest period of time until the target ratio is satisfied.

29. The computer implemented method of claim 27, wherein deleting data from the second storage sufficient to satisfy the target ratio comprises deleting data from the second storage that has been stored in the second storage for a period that exceeds a defined retention time.

30. A control system, comprising:
a receiver adapted to receive a plurality of container frames collectively comprising a single data stream over a network, the single data stream composed of a plurality of resolution encodings that encode at least a portion of a source video stream using at least one different video encoding parameter, each container frame comprising a plurality of virtual frames and a container timestamp applicable to each of the plurality of virtual frames, and each of the plurality of virtual frames being associated with one of the plurality of resolution encodings;
a processor adapted to associate each of the received plurality of virtual frames within each container frame with an encoding, identify a storage for at least one of the received plurality of virtual frames based upon the encoding associated with the at least one virtual frame, and to reconstruct a virtual stream of the associated virtual frames according to the container timestamps; and
a transmitter adapted to transmit the virtual stream over the network.

31. The control system of claim 30, wherein:
each container frame comprises a descriptor describing the plurality of virtual frames; and
the processor is further adapted to associate the descriptor with the virtual stream.

32. The control system of claim 31, wherein:
the descriptor comprises an indication of an area of a source video that is encoded.

33. The control system of claim 32, wherein:
the transmitter is further adapted to transmit the virtual stream upon receipt of a request for the virtual stream, the request comprising the descriptor.

* * * * *

UNITED STATES PATENT AND TRADEMARK OFFICE
CERTIFICATE OF CORRECTION

Page 1 of 2

PATENT NO. : 9,489,387 B2
APPLICATION NO. : 14/568077
DATED : November 8, 2016
INVENTOR(S) : Shaun P. Marlatt and Oren Shir It is certified that error appears in the above-identified patent and that said Letters Patent is hereby corrected as shown below:

In the Claims

Claim 1, Column 16, Line 8, delete:
"A computer implemented method for managing data, comprising: a computing system identifying at least a first storage area for storing a first category of data and a second storage area for storing a second category of data; the computing system receiving a plurality of data streams data stream composed of a plurality of resolution encodings that encode at least a portion of a source stream using at least one different video encoding parameter; the computing system associating one or more of the plurality of resolution encodings data streams from the received plurality of data streams with the first storage area and associating one or more of the plurality of resolution encodings data streams from the received plurality of streams with the second storage area; the computing system storing, in the first storage area, data for the one or more of the plurality of resolution encodings more data streams associated with the first storage area and storing, in the second storage area, data for the one or more of the plurality of resolution encodings data streams associated with the second storage area; the computing system determining data stored in at least one of the first storage area and the second storage exceeds a threshold; and deleting data in excess of the threshold, wherein the threshold is based on either a specified maximum retention time or a specified amount of data to be stored in the first storage area and in the second storage area."

And insert:
--A computer implemented method for managing data, comprising: a computing system identifying at least a first storage area for storing a first category of data and a second storage area for storing a second category of data; the computing system receiving a data stream composed of a plurality of resolution encodings that encode at least a portion of a source stream using at least one different video encoding parameter; the computing system associating one or more of the plurality of resolution encodings with the first storage area and associating one or more of the plurality of resolution encodings with the second storage area; the computing system storing, in the first storage area, data for the one or more of the plurality of resolution encodings associated with the first storage area and storing, in the second storage area, data for the one or more of the plurality of resolution encodings associated with the second storage area; the computing system determining data stored in at least Signed and Sealed this
Twenty-ninth Day of January, 2019

Andrei Iancu
*Director of the United States Patent and Trademark Office* one of the first storage area and the second storage exceeds a threshold; and deleting data in excess of the threshold, wherein the threshold is based on either a specified maximum retention time or a specified amount of data to be stored in the first storage area and in the second storage area.--